United States Patent [19]

Musha et al.

[11] Patent Number: 4,661,816
[45] Date of Patent: Apr. 28, 1987

[54] ADAPTIVE RADAR SIGNAL PROCESSOR

[75] Inventors: Toshimitsu Musha; Eichi Kiuchi; Toshihiko Hagisawa, all of Tokyo, Japan

[73] Assignee: NEC Corporation, Japan

[21] Appl. No.: 539,239

[22] Filed: Oct. 5, 1983

[30] Foreign Application Priority Data

Oct. 5, 1982 [JP] Japan .................. 57-174897

[51] Int. Cl.[4] .............................................. G01S 7/30
[52] U.S. Cl. ...................................... 342/91; 342/159
[58] Field of Search .................. 343/5 DP, 5 CE, 7.7, 343/7 A, 5 CF, 17.1 R; 364/516, 517, 724; 342/159, 195

[56] References Cited

U.S. PATENT DOCUMENTS

| | | | |
|---|---|---|---|
| 3,987,442 | 10/1976 | McLeod, Jr. | 343/5 DP X |
| 3,995,271 | 11/1976 | Goggins, Jr. | 343/7 A |
| 4,028,697 | 6/1977 | Albanese et al. | 343/17.1 R X |
| 4,064,511 | 12/1977 | Mantanovsky | 343/7 A |
| 4,280,128 | 7/1981 | Masak | 343/380 |
| 4,375,640 | 3/1983 | Harvey | 343/7.7 |

Primary Examiner—T. H. Tubbesing
Assistant Examiner—Gilberto Barrón, Jr.
Attorney, Agent, or Firm—Sughrue, Mion, Zinn, Macpeak, and Seas

[57] ABSTRACT

An adaptive radar signal processor is operable to effectively suppress clutters and extract a target signal with a high degree of accuracy and includes a memory storing two-dimensional radar data corresponding to range and azimuthal directions, multipliers multiplying each of data of the same range but different azimuthal direction read out from the memory, an adder generating the added data of the multipliers as an estimated data, and a weighting coefficient determiner which determines the optimum weighting coefficients based upon the stored radar data so that the difference between the radar data and the estimated data at an observing position is minimized, and produces the difference data as a clutter-suppressed radar data.

8 Claims, 2 Drawing Figures

ADAPTIVE RADAR SIGNAL PROCESSOR

BACKGROUND OF THE INVENTION

This invention relates to a radar signal processor and more particularly, to an adaptive radar signal processor which makes it possible to detect a target under optimal conditions suitable for a space environment to be searched.

The most important problem for a radar is to detect a target signal with a high detection probability from a variety of clutters such as ground clutter from fixed objects such as ground and mountains, weather clutter from clouds and rain, sea clutter from ocean waves, angel echo from a flock, and so forth.

The MTI (Moving Target Indicator) technique has been used to cope with the ground clutter and the LOG/CFAR (Logarithmic/Constant False Alarm Rate) technique, for other clutters. The MTI technique is based upon the premise that ground clutter is in a steady state. In practice, however, "fluctuation" resulting from radar hardware instability or "fluctuation" resulting from swaying objects contained in the fixed object such as woods exists and the ground clutter is not always in the steady state. In such a case, clutter residue occurs.

On the other hand, the LOG/CFAR technique processes signals on the assumption that the statistical property of the clutter follows the Rayleigh distribution. It is reported that weather clutter follows the Rayleigh distribution, however, the other clutters follow the Log-normal distribution or Weibull distribution which encompasses the Rayleigh distribution as a special case. Hence, clutter residue still occurs in accordance with this technique.

As described above, the conventional radar apparatuses assume that the property of the clutter is in the fixed (steady) state, and carry out signal processing corresponding to that state. However, because the clutter property actually varies, clutter residue occurs and target detection with a high detection probability is difficult.

An adaptive array automatically generating the null of antenna directivity in the arriving direction of interference waves (e.g., SIDNEY P. APPLEBAUM, "Adaptive Arrays", IEEE TRANSACTIONS ON ANTENNAS AND PROPAGATION, VOL. AP-24, No. 5, Sept. 1976, pp. 585-598) and adaptive techniques such as an adaptive MTI technique that changes the cut-off range of a filter to match it with the clutter Doppler frequency have been proposed. However, the former can not detect the target on the clutter. Since the clutter Doppler frequency spread changes variously in accordance with the properties of the clutter, the clutter can not be removed sufficiently by merely changing the cut-off range as in the adaptive MTI technique.

SUMMARY OF THE INVENTION

It is therefore an object of the present invention to provide an adaptive radar signal processor whose construction itself is changeable in accordance with the space to be searched, particularly the condition of the space or the properties of radar reception signals.

It is another object of the present invention to provide an adaptive radar signal processor which can effectively suppress clutters and can extract a target with a high level of accuracy.

In accordance with the present invention, there is provided an adaptive radar apparatus which comprises a memory for storing radar data in a time sequence; means for reading out the radar data from the same distance in response to a plurality of transmission pulses; a plurality of multipliers for multiplying each of the data by a predetermined weighting coefficient; and adder for adding the outputs of the multipliers; weighting coefficient determination means for determining the weighting coefficients necessary for the optimal estimation of the data corresponding to a predetermined point m among the time sequence radar data using the radar data for a predetermined range; and a subtractor for producing the difference between the radar data for the predetermined point and the estimation data obtained from the adder.

These and other objects and features of the present invention will become more apparent from the following description to be taken in conjunction with the accompanying drawings.

DESCRIPTION OF THE PREFERRED EMBODIMENTS

The present invention estimates unknown data by way of the linear prediction method from known data by utilizing the fact that when radar reception signals obtained in the time sequence are sampled at predetermined time intervals, the resulting sampled data have correlation between them. When expressed numerically, reception data X(m) at a time point m can be estimated by equation (1) using N data obtained at time points prior to the time point m:

$$X(m) = W_1 \cdot X(m+1) + W_2 \cdot X(m+2) + W_3 \cdot X(m+3) + \ldots + W_N \cdot X(m+N) = \sum_{l=1}^{N} W_l \cdot X(m+l) \quad (1)$$

where $W_l$ is a weighting factor for weighting data $X(m+l)$. Signal processing of equation (1) can be carried out by a digital filter consisting of a tapped delay circuit (memory), weighting (multiplication) circuits for applying predetermined weight to each tap output and an addition circuit for adding the output of each weighting circuit.

Generally, a target such as an airplane has spatial expansion which is by far smaller than that of the clutter described previously and hence, has scarcely any correlation between the sampled data, but there is high correlation between the sampled clutter data. Accordingly, the estimation expressed by equation (1) is directed to an object having spatial expansion such as the clutter. If the target exists on the clutter, therefore, the estimation of the radar data from the region in which the target exist leads to the estimation of the clutter data. As a result, if an optimal estimation is carried out for the input data which vary momentarily and the estimated data is subtracted from the radar data containing the target, the clutter components can be removed and suppressed and the target signal becomes distinct. The present invention is based fundamentally upon the principle described above. Hereinafter, the present invention will be described with reference to an adaptive radar signal processor by way of example.

Figure 1:
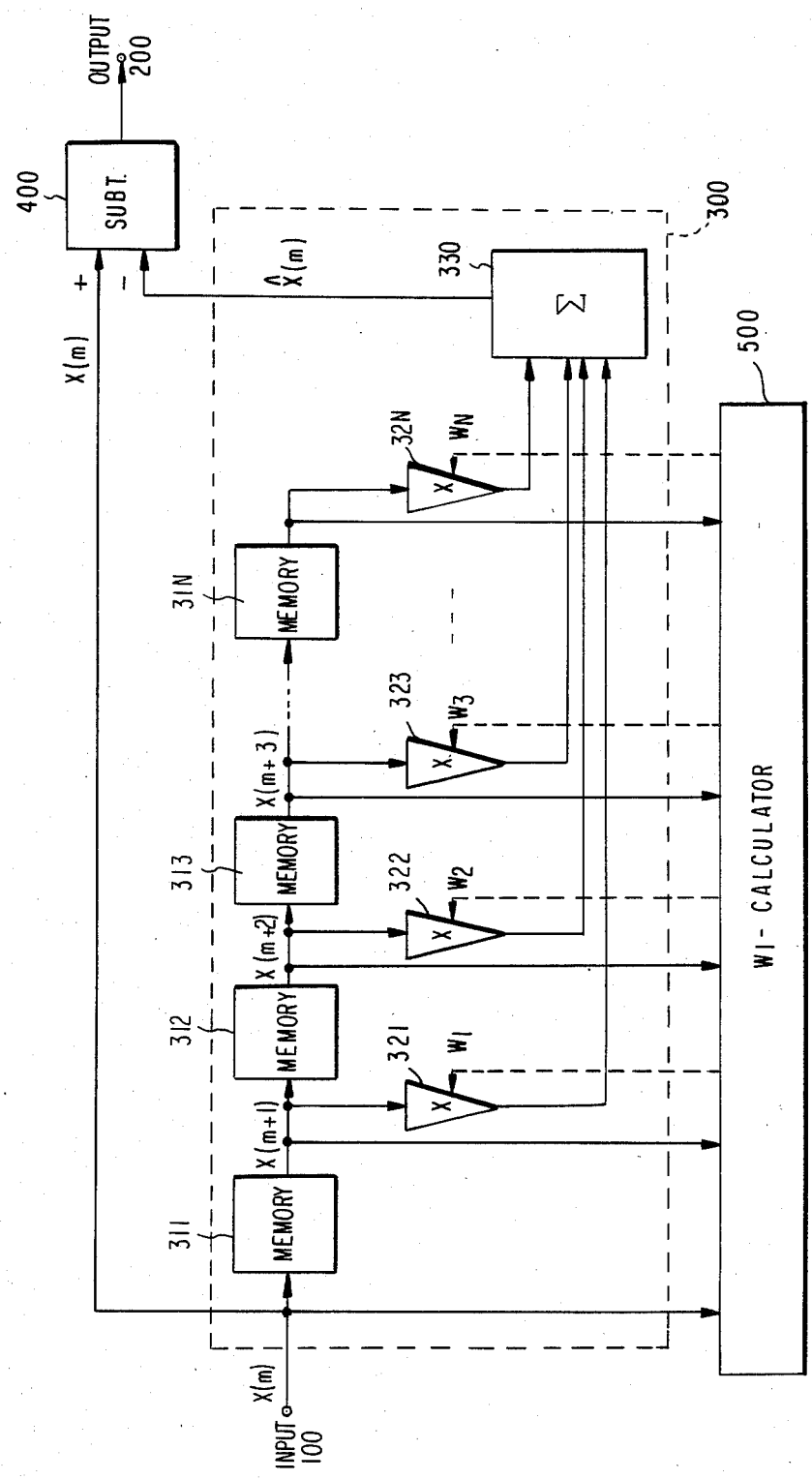
FIG. 1 is a block diagram showing the construction of principal portions of the radar signal processor of the present invention.

FIG. 1 is a block diagram showing the fundamental construction of the present invention consisting of a digital filter portion 300 for estimating input data, a weighting coefficient control portion 500 for calculating the weighting coefficient for optimization and a substraction portion 400 for subtracting the estimated data from the existing input data at the time point which becomes the object of attention. The circuit elements forming these portions are all complex number calculation circuits.

A complex signal I+jQ, that is divided into an in-phase signal (I signal) and a quadrature-phase signal (Q signal) having a phase difference $\pi/2$ with the former, is applied from the input terminal 100 through an antenna, an IF amplifier and a phase detector.

The digital filter 300 has an N-stage configuration and its calculation processing is effected for N continuous signals (signals for N directions) corresponding to the same distance among a series of signals obtained for every transmission pulse.

Hundreds to thousands of digital data are generally obtained for a transmitted pulse in a radar and the term "sweep memory" in this case represents a memory which has a capacity of (number of data per transmitted pulse)×(the number of digitized bits) and this corresponds to the capacity necessary for storing the signals obtained in each pulse repetition period. Each of the memories 311, 312, 313, ..., 31N that form the digital filter 300 has one sweep memory capacity. When the radar data X(m) is applied from the input terminal 100, continuous data X(m+1), x(m+2), X(m+3), ..., X(m+N) of the same distance are read out synchronously from these memories. Predetermined weighting coefficients $W_1, W_2, W_3, \ldots, W_N$ are multiplied by the outputs of the memories 311, 312, 313, ..., 31N by multipliers 321, 322, 323, ..., 32N, respectively. The adder 330 carries out the processing of equation (1) by adding these multiplier outputs and applies an estimated value $\hat{X}(m)$ to the subtractor 400. The subtractor 400 produces the difference between the radar data X(m) and the estimated data $\hat{X}(m)$ at the time point m. As described earlier, this output is the signal obtained after suppressing the clutter component. Accordingly, if the target exists, only the target signal appears.

The weighting coefficient control circuit 300 determines the weighting coefficients $W_0, W_1, W_2, \ldots, W_N$ necessary for carrying out optimal estimation at each time point and changes and sets the weighting coefficient for each multiplier. This decision is carried out in the following manner.

The difference e(m) between the estimated value $\hat{X}(m)$ by equation (1) and a true value X(m), that is, the estimation error, can be given as follows:

$$e(m) = X(m) - \hat{X}(m) \qquad (2)$$

$$= X(m) - \sum_{l=1}^{N} W_l \cdot X(m + l)$$

Generally, when the estimation is made M times and M estimation error data e(m) (m=1, 2, ..., M) are obtained, the sum E(m) of the squares of the estimation errors is given by:

$$E(m) = \sum_{m=1}^{M} |e(m)|^2 \qquad (3)$$

$$= \sum_{m=1}^{M} \left| X(m) - \sum_{l=1}^{N} W_l \cdot X(m + l) \right|^2 \qquad (3)$$

The weighting coefficient $W_l$ (l=1, 2, ..., N) that minimizes E(m) is determined by the following equation (3) by the application of the LMS algorithm:

$$\frac{\partial E(m)}{\partial W_l} = 0 \qquad (4)$$

If the coefficient $W_l$ is expressed by a complex coefficient ($W_l = U_l + jV_l$), $U_l$ and $V_l$ satisfying the following equation (5) can be obtained:

$$\frac{\partial E(m)}{\partial U_l} = 0 \quad \frac{\partial E(m)}{\partial V_l} = 0 \; (l = 1, 2, \ldots, N) \qquad (5)$$

If the weighting coefficient obtained in this manner is expressed as $\overset{\circ}{W}_l$, optimum estimation is possible by suitably calculating $\overset{\circ}{W}_l$ in accordance with the change of the input radar data.

Definite calculation of $\overset{\circ}{W}_l$ is carried out in the following manner. Equation (3) can be expressed as follows by introducing a factor $a_l = -W_l$:

$$E(m) = \sum_{m=1}^{M} \left| X(m) + \sum_{l=1}^{N} a_l \cdot X(m + l) \right|^2 \qquad (6)$$

The right side of equation (6) is expanded and a mean value is obtained for each item. Then, the following linear simultaneous equation can be obtained in consideration of equation (4):

$$\begin{bmatrix} \sum_l X(m-1)X(m-1) & \sum_l X(m-2)X(m-1) & \ldots & \sum_l X(m-N)X(m-1) \\ \sum_l X(m-1)X(m-2) & \sum_l X(m-2)X(m-2) & \ldots & \sum_l X(m-N)X(m-2) \\ \vdots & \vdots & & \vdots \\ \sum_l X(m-1)X(m-N) & \sum_l X(m-2)X(m-N) & \ldots & \sum_l X(m-N)X(m-N) \end{bmatrix} \begin{bmatrix} a_1 \\ a_2 \\ \vdots \\ a_N \end{bmatrix} = - \begin{bmatrix} \sum_l X(m)X(m-1) \\ \sum_l X(m)X(m-2) \\ \vdots \\ \sum_l X(m)X(m-N) \end{bmatrix} \qquad (7)$$

Here, by defining the auto-correlation function R $$R_l = \sum_{m=-\infty}^{\infty} X(m) \cdot X(m + l) \qquad (8)$$

then, equation (6) can be expressed by the following equation (7):

$$\begin{bmatrix} R_0 & R_1 & \ldots R_{N-1} \\ R_1 & R_0 & \ldots R_{N-2} \\ \vdots & \vdots & \vdots \\ R_{N-1} & R_{N-2} \ldots R_0 \end{bmatrix} \begin{bmatrix} a_1 \\ a_2 \\ \vdots \\ a_N \end{bmatrix} = - \begin{bmatrix} R_1 \\ R_2 \\ \vdots \\ R_N \end{bmatrix} \quad (9)$$

Here, the steadiness of X(m) is assumed by regarding $R_l = R_{-l}$. If the function matrix using $R_l$ of the left side of equation (9) is a positive constant value, its inverse matrix exists and $a_l$, that is, $W_l$, can be obtained from the equation in accordance with a known algorithm, the Levinson-Durbin method.

Calculations in the foregoing description are all complex calculation and include naturally the estimation of the data of the I and Q signals having the phase difference of $\pi/2$ to carry out the estimation calculation of the amplitude from them. In this case, the estimation errors of the I and Q components at the time point m are obtained in accordance with the following equation (10):

$$E_I(m) = I(m) - \hat{I}(m)$$
$$E_Q(m) = Q(m) - \hat{Q}(m) \quad (10)$$

and then, the estimation error relating to the amplitude is obtained in accordance with the following equation (11) to obtain the weighting factor in the same way as described above:

$$E_p(m) = \sqrt{E_I(m)^2 + E_Q(m)^2} \quad (11)$$

In the embodiment described above, the estimation at the time point m is carried out using the data obtained prior to the time point m. When the target exists in the proximity of the center of the clutter, however, it is preferred to use the data before the time point m as well as the data after the time point m in order to carry out optimal estimation. For, the estimation accuracy becomes higher with an increasing data quantity used for the estimation. The present invention proposes an adaptive radar signal processor based upon this principle.

Figure 2:
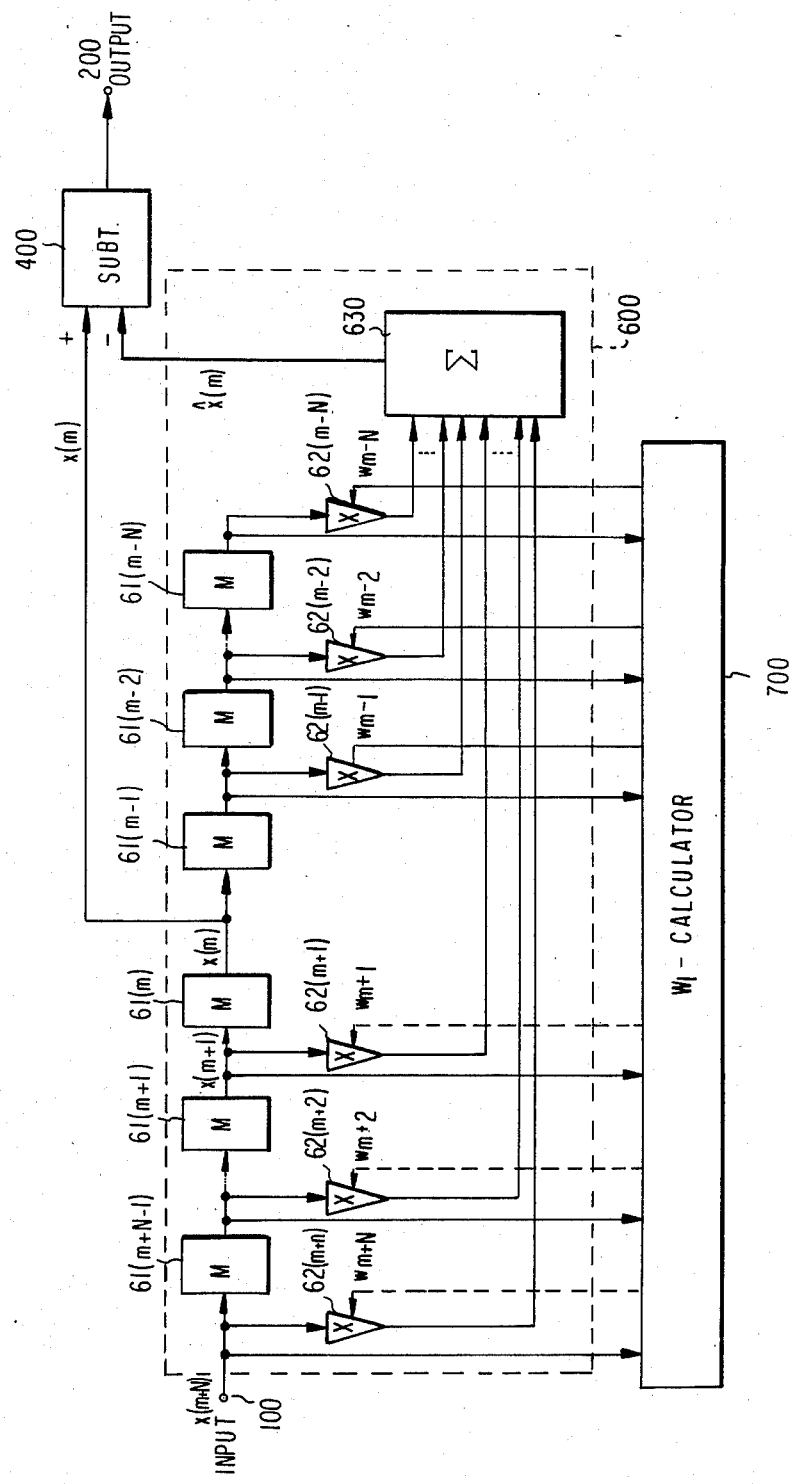
FIG. 2 is a block diagram showing the construction of the principal portions of another embodiment of the invention.

Its definite construction is illustrated in FIG. 2. Though the fundamental construction is the same as that shown in FIG. 1, signal processing is made for 2N radar data X(m+N), ... X(m+2), X(m+1), X(m−1), X(m−2) ..., X(m−N) obtained before and after the time point m and predetermined weighting is effected for the radar data by multipliers 62(m+N), ..., 62(m+1), 62(m−1), ..., 62(m−N). In other words, weighting of $W_{m+N}$ is made for the radar data X(m+N) applied to the input terminal 100 by the multiplier 62(m+N), and weighting of $W_{m+1}$, to the output X(m+1) of the memory 61(m+1) by the multiplier 62(m+1). Similarly, weighting of $W_{m-N}$ is made to the output X(m−N) of the memory 61(m−N) by the multiplier 62(m−N). The outputs of these multipliers are added by the adder 630, providing the estimation data $\hat{X}(m)$ at the time point m. The subtractor 400 obtains the difference output between the output X(m) of the memory 61(m) and the estimation value $\hat{X}(m)$, and applies it to the output terminal 200. This output becomes a signal whose clutter component is suppressed, in the same way as in FIG. 1.

The weighting coefficient control circuit 700 calculates the weighting coefficients for the multipliers 62(m+N), ... 62(m+1), 62(m−1), ..., 62(m−N) by linear interpolation on the basis of N data before and after this time point m and sets the weighting coefficient for each multiplier. The optimal weighting coefficients for determining the estimation value $\hat{X}(m)$ of the radar data X(m) by linear interpolation can be obtained in the same way as in Example 1. That is, $$\begin{bmatrix} R_0 & R_1 & \ldots R_{N-1} & R_{N+1} \ldots R_{2N} \\ R_1 & R_0 & \ldots R_{N-2} & R_N & \ldots R_{2N-1} \\ \vdots & \vdots & \vdots & \vdots & \vdots \\ R_{N-1} & R_{N-2} & \ldots R_0 & R_2 & \ldots R_{N+1} \\ R_{N+1} & R_N & \ldots R_2 & R_0 & \ldots R_{N-1} \\ \vdots & \vdots & \vdots & \vdots & \vdots \\ R_{2N} & R_{2N-1} \ldots R_{N+1} & R_{N-1} \ldots R_0 \end{bmatrix} \begin{bmatrix} a_{-N} \\ a_{-(N-1)} \\ \vdots \\ a_{-1} \\ a_1 \\ \vdots \\ a_N \end{bmatrix} = - \begin{bmatrix} R_N \\ R_{N-1} \\ \vdots \\ R_1 \\ R_1 \\ \vdots \\ R_N \end{bmatrix} \quad (12)$$

It can be seen by taking the symmetry of the matrices into consideration that $a_{i=a-i}$ (i=1, 2, ..., N). Hence, equation (12) can be changed as follows:

$$\begin{bmatrix} (R_{N-1} + R_{N+1}) & (R_{N-2} + R_{N+2}) \ldots (R_0 + R_{2N}) \\ (R_{N-2} + R_N) & (R_{N-3} + R_{N+1}) \ldots (R_1 + R_{2N-1}) \\ \vdots & \vdots \\ (R_0 + R_2) & (R_1 + R_3) & \ldots (R_{N-1} + R_{N+1}) \end{bmatrix} \begin{bmatrix} a_1 \\ a_2 \\ \vdots \\ a_N \end{bmatrix} = - \begin{bmatrix} R_1 \\ R_2 \\ \vdots \\ R_N \end{bmatrix} \quad (13)$$

In other words, if the auto-correlation coefficients of from $R_0$ to $R_{2N}$ are determined, the interpolation coefficients (weighting coefficients) can be obtained by following the same procedures as in the linear estimation of the estimation item number N (the case shown in FIG. 1).

Though some preferred embodiments of the invention have been described, the optimization method varies with the given condition. When, for example, the target exists close to the center of the clutter, estimation by linear interpolation shown in FIG. 2 is preferably used. When the target exists at the end portion of the clutter, estimation by linear interpolation using the data before or after the time point m is preferred. It is obvious that calculation of the weighting coefficients for the optimal estimation can be made by methods other than the LMS method described above.

What is claimed is:

1. An adaptive radar apparatus comprising:
   a memory for storing radar data in a time sequence;
   means for reading out the radar data from the same range in response to a plurality of transmission pulses;
   a plurality of multipliers for multiplying each of a plurality of data read out from said memory by a predetermined weighting coefficient;
   an adder for adding the outputs of said multipliers and generating the added data as an estimated data relative to an observing position;
   weighting coefficient determination means for determining the weighting coefficients based upon said stored radar data necessary for the optimal estimation of the data at said observing position so that the difference between the radar data and the estimated data at said observing position is minimized; and
   means for producing the difference between the radar data and the estimated data obtained from said adder as a clutter-suppressed radar signal.

2. The adaptive radar apparatus as defined in claim 1, wherein said weighting coefficient determination means is responsive to radar data which are obtained before the radar data relative to said observing position and includes input terminals for receiving from said memory said radar data obtained before the radar data relative to said observing position.

3. The adaptive radar apparatus as defined in claim 1, wherein said weighting coefficient determination means is responsive to radar data which are obtained after the radar data relative to said observing position and include input terminals for receiving from said memory said radar data obtained after the radar data relative to said observing position.

4. The adaptive radar apparatus as defined in claim 1, wherein said weighting coefficient determination means is responsive to radar data for a range including said observing position and expanding in an azimuthal direction and includes input terminals for receiving from said memory said radar data for a range including said observing position and expanding in an azimuthal direction.

5. The adaptive radar apparatus as defined in claim 1, wherein said weighting coefficient determination means includes Least Mean Square calculating means for determining the weighting coefficient so that the squared value of said difference is minimized according to the Least Mean Square (LMS) algorithm.

6. The adaptive radar apparatus as defined in claim 1, wherein said weighting coefficient determination means is responsive to radar data which are obtained before and after the radar data relative to said observing position and includes input terminals for receiving from said memory said radar data obtained before and after the radar data relative to said observing position.

7. The adaptive radar apparatus as defined in claim 1, wherein said weighting coefficient determination means includes means for causing said apparatus to generate a plurality of said estimation data from said adder, further means for obtaining the sum E(m) of the squares of the estimation data generated by said adder and means for determining the optimum weighting coefficient $W_l$ that minimizes the sum E(m) according to the following expression, $$\partial E(m)/\partial W_l = 0.$$

8. The adaptive radar apparatus as defined in claim 5, wherein said LMS calculating means includes means for calculating auto-correlation coefficients and solving a linear simultaneous equation having the auto-correlation coefficients as equation coefficients.

* * * * *

UNITED STATES PATENT AND TRADEMARK OFFICE
CERTIFICATE OF CORRECTION

PATENT NO. : 4,661,816
DATED : April 28, 1987
INVENTOR(S) : Toshimitsu Masha et al It is certified that error appears in the above-identified patent and that said Letters Patent is hereby corrected as shown below:

Column 3, Line 67, In the first occurance of "X(m)" insert --^-- above "X"

Column 4, Line 62, After "R" insert --as--

Column 4, Line 68, Delete "(7)" insert --(9)--

Signed and Sealed this

Tenth Day of May, 1988

Attest:

DONALD J. QUIGG

Attesting Officer

Commissioner of Patents and Trademarks